United States Patent
Araki (10) Patent No.: US 11,119,512 B2
(45) Date of Patent: Sep. 14, 2021

(54) GUIDING DEVICE, FLYING OBJECT AND GUIDING METHOD

(71) Applicant: MITSUBISHI HEAVY INDUSTRIES, LTD., Tokyo (JP)

(72) Inventor: Shunsuke Araki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 138 days.

(21) Appl. No.: 16/369,097

(22) Filed: Mar. 29, 2019

(65) Prior Publication Data

US 2020/0057456 A1 Feb. 20, 2020

(30) Foreign Application Priority Data

Aug. 16, 2018 (JP) .............................. JP2018-153281

(51) Int. Cl.
| | |
|---|---|
| *G05D 1/12* | (2006.01) |
| *G05D 1/00* | (2006.01) |
| *G05D 1/10* | (2006.01) |
| *F41G 7/34* | (2006.01) |
| *G06T 7/20* | (2017.01) |
| *F41G 7/28* | (2006.01) |
| *F41G 7/22* | (2006.01) |
| *F41G 7/00* | (2006.01) |

(52) U.S. Cl.
CPC .............. *G05D 1/12* (2013.01); *F41G 7/343* (2013.01); *G05D 1/0094* (2013.01); *G05D 1/107* (2013.01); *F41G 7/28* (2013.01); *G06K 2209/21* (2013.01); *G06T 7/20* (2013.01)

(58) Field of Classification Search
CPC ..... G05D 1/0005; F41G 7/306; F41G 7/2206; F41G 7/263; F41G 7/305; F41G 7/36
See application file for complete search history.

(56) References Cited

U.S. PATENT DOCUMENTS

| | | | | |
|---|---|---|---|---|
| 4,288,049 A | * | 9/1981 | Alpers | F41G 7/2206 244/3.14 |
| 5,478,028 A | * | 12/1995 | Snyder | F41G 7/305 244/3.11 |
| 5,601,255 A | * | 2/1997 | Romer | F41G 7/263 244/3.13 |
| 5,788,179 A | * | 8/1998 | Wicke | F41G 7/306 244/3.1 |
| 5,804,812 A | * | 9/1998 | Wicke | F41G 7/306 244/3.1 |

(Continued)

FOREIGN PATENT DOCUMENTS

JP 11-211396 8/1999

*Primary Examiner* — Bernarr E Gregory
(74) *Attorney, Agent, or Firm* — Wenderoth, Lind & Ponack, L.L.P.

(57) ABSTRACT

In a guiding device, a communication device receives a signal containing detection data of a target, and a processing unit. In the processing unit, a course setting section sets a flight course for a lofted flight based on the detection data, and a guiding section determines a progressing direction based on the flight course and outputs a guidance signal containing the progressing direction. The course setting section sets a first flight course when the flying object is launched. Also, the course setting section changes the first flight course to a second flight course based on the detection data after launching of the flying object.

8 Claims, 6 Drawing Sheets

(56) References Cited

U.S. PATENT DOCUMENTS

| | | | | |
|---|---|---|---|---|
| 5,811,788 A * | 9/1998 | Wicke | ................... | F41G 7/306 |
| | | | | 244/3.1 |
| 5,938,148 A * | 8/1999 | Orenstein | ............. | F41G 7/2206 |
| | | | | 244/3.15 |
| 5,944,762 A * | 8/1999 | Bessacini | ................ | F41G 7/306 |
| | | | | 701/27 |
| 6,085,147 A * | 7/2000 | Myers | .................. | G05D 1/0005 |
| | | | | 342/33 |
| 10,323,907 B1 * | 6/2019 | Wright | ..................... | F41G 7/36 |
| 2007/0158492 A1 * | 7/2007 | Lam | ...................... | F41G 7/2206 |
| | | | | 244/3.15 |

\* cited by examiner

GUIDING DEVICE, FLYING OBJECT AND GUIDING METHOD

TECHNICAL FIELD

The present invention relates to a guiding device, a flying object and a guiding method.

BACKGROUND ART

Generally, a flying object flies on a course in which an interception probability of a target is high. For example, in this course, a time to reach the target can be minimized. Or, this course may be a course in which the speed of the flying object reaching the target is maximized. For these reasons, the flight distance of the flying object becomes shorter than the maximum flight distance.

A method of extending the flight distance of the flying object is known in which the flying object is launched at a launching angle higher than that of a calculated course. Patent Literature 1 discloses a method of calculating a course for the extended flight distance, in which one is selected from among previously calculated courses based on the speed, position, altitude and so on of the target.

CITATION LIST

[Patent Literature 1] JP H11-211396A

SUMMARY OF THE INVENTION

Conventionally, a flight course of a flying object is first determined once to extend its flight distance. However, the inventor of the present invention found that there was a case that the determined flight course of the flying object did not become optimal when the target changed a moving course.

The present invention has been made in view of the above situations, and has as an object, to change a flight course to a course with an extended flight distance according to the state of the target.

As for other purposes, it would be possible to understand from the following description and the explanation of embodiments.

To achieve the above object, a guiding device according to an embodiment of the present invention has a communication device and a processing unit. The communication device receives a detection signal which contains detection data of a target. The processing unit determines a progressing direction of a flying object based on the detection data. The processing unit has a course setting section and a guiding section. The course setting section sets a flight course for a lofted flight based on the detection data when the flying object carries out a lofted flight for the target. The guiding section determines the progressing direction based on the flight course and outputs a guidance signal which contains data showing the progressing direction. Also, the course setting section sets a first flight course as the flight course when launching the flying object. Moreover, the course setting section changes the flight course from the first flight course to a second flight course according to the detection data after launching the flying object.

The flying object according to another embodiment of the present invention has the above-mentioned guiding device and a steering device. The steering device controls the progressing direction of the flying object in response to the guidance signal.

A guiding method according to another embodiment of the present invention contains the following steps to be executed by the processing unit. The steps contain:

setting a first flight course for a lofted flight when a flying object carries out the lofted flight for a target based on detection data of the target in case of launching the flying object;

determining a progressing direction of the flying object based on the first flight course, to output a guidance signal which contains data showing the progressing direction;

changing a flight course from the first flight course to a second flight course for the lofted flight when the flying object carries out the lofted flight for the target based on the detection data, after launching of the flying object; and determining the progressing direction based on the second flight course, to output a guidance signal which contains data showing a progressing direction.

According to the present invention, it is possible to set an optimal course to extend the flight distance of the flying object.

DESCRIPTION OF THE EMBODIMENTS (Items which Inventor had Recognized)

Figure 1:
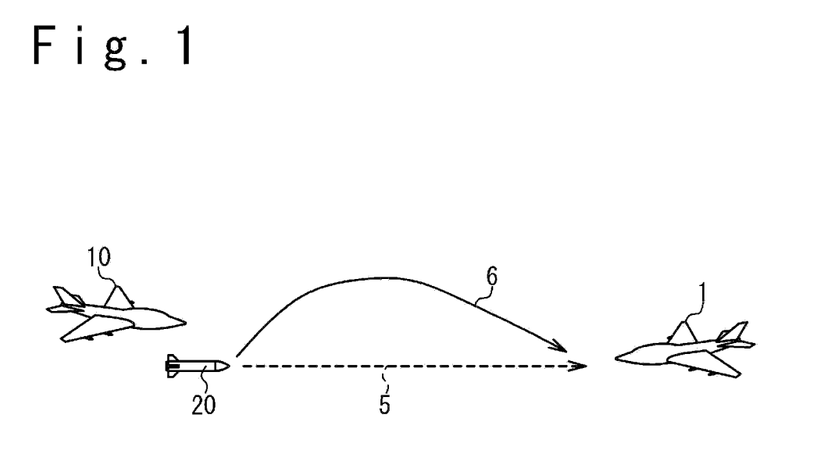
FIG. 1 is a diagram showing a lofted flight course of a flying object.

As shown in FIG. 1, a flying object 20 launched from an aircraft 10 flies for a target 1. A flight course in this case is an ordinary course 5 in which a probability that the flying object 20 intercepts the target 1 is highest.

When aiming to extend a flight distance, the flying object 20 takes a lofted flight course 6 in which the flying object 20 temporarily rises higher than the ordinary course 5. In other words, the flying object 20 is accelerated while taking an increased elevation angle with respect to a progressing direction in the ordinary course 5. Thus, the flying object 20 flies along the lofted flight course 6 that is temporarily higher than the ordinary course 5. As a result, the flight distance of the flying object 20 is extended to be longer than in case of the flight along the ordinary course 5. In this case, the above flight is called a lofted flight in which the flying object 20 is accelerated at a larger elevation angle with respect to the progressing direction of the ordinary course 5.

Figure 2:
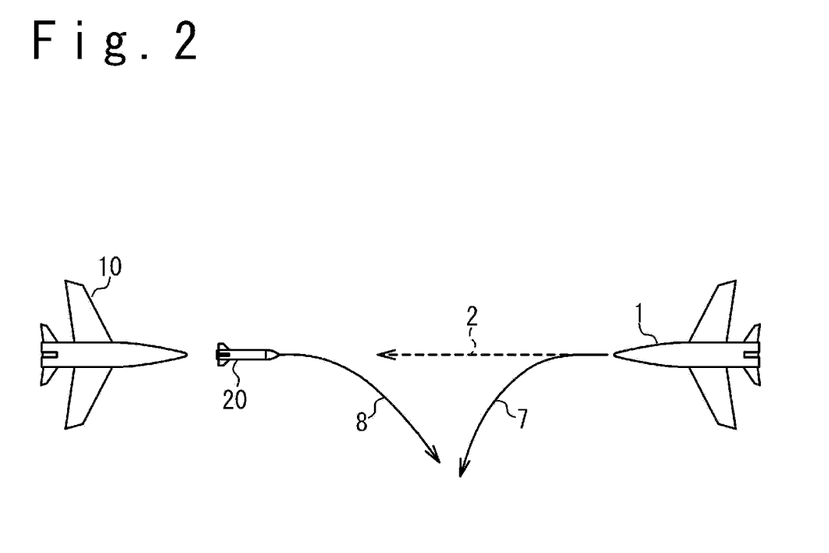
FIG. 2 is a diagram showing a flight course of the flying object which accompanies evacuation behavior of a target.

When detecting the flying object 20 launched from the aircraft 10, the target 1 carries out evacuation behavior 7, as shown in FIG. 2. Therefore, the flying object 20 flies along a tracking course 8 to track the target 1 according to the evacuation behavior 7 of the target 1. In this case, when the target 1 turns rapidly due to the evacuation behavior 7, the flying object 20 must turn rapidly according to the turn of target 1.

The flying object 20 turns by use of aerodynamic control using air resistance, side thruster using thrust, thrust vector control (TVC) and so on. When turning by use of the aerodynamic control, the flying object 20 needs to fly in an enough faster speed. The speed of the flying object 20 drops due to the air resistance upon the turning. Also, in order for the flying object 20 to turn by use of the side thruster, TVC, and so on, more fuel is needed.

The elevation angle is increased when the flying object 20 carries out the lofted flight. Therefore, the flight speed drops to a speed slower than the flight on the ordinary course 5. Also, when the target 1 turns rapidly due to the evacuation behavior 7, the flying object 20, too, is necessary to turn rapidly to track the target 1. Therefore, the flying object 20 comes off an optimal course largely and turns largely. When the flying object 20 turns by use of the aerodynamic control, the flight speed of the flying object 20 drops since the flying object 20 turns largely. As a result, the flying object 20 cannot maintain the flight speed, and the flight distance becomes short. Also, when the flying object 20 turns by use of the side thruster, TVC, and so on, the flying object 20 turns largely so that the fuel is consumed. As a result, there is a case that the fuel for turning is short in the flying object 20. In this way, the inventor found that the flight distance became short even though the flying object 20 carried out the lofted flight when the target 1 turns rapidly.

(Embodiments)

Figure 3:
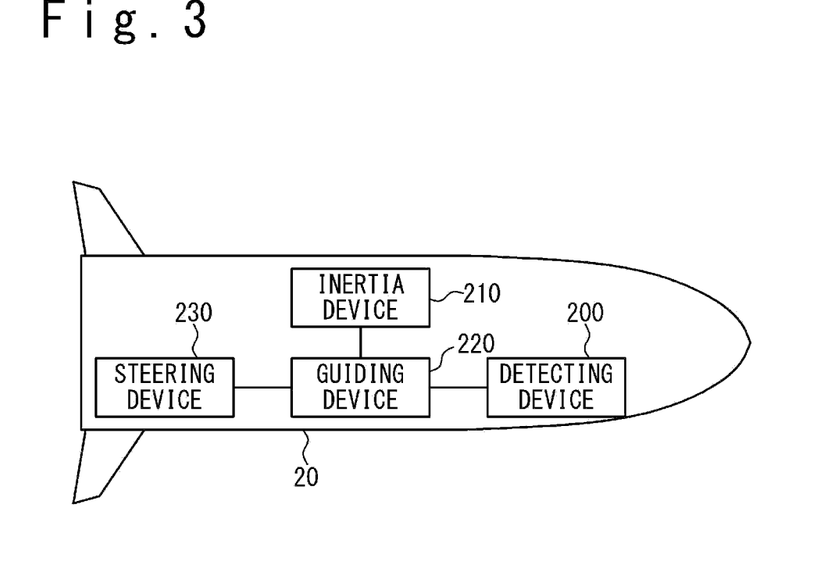
FIG. 3 is a diagram showing a configuration of the flying object.

As shown in FIG. 3, the flying object 20 according to an embodiment has a guiding system of a detecting device 200, an inertia device 210, a guiding device 220 and a steering device 230. The detecting device 200 detects a state of the target 1 such as position, speed and acceleration, and outputs the detected state of the target 1 to the guiding device 220 as detection data. The inertia device 210 measures a state of the flying object 20 such as position, speed, acceleration and attitude angle, and outputs the measured state of the flying object 20 to the guiding device 220 as inertia data. The guiding device 220 determines a flight course of the flying object 20 based on the detection data and the inertia data. The guiding device 220 generates a guidance signal which contains data such as the progressing direction of the flying object 20 based on the determined flight course, and outputs to the steering device 230. The steering device 230 changes the flight direction of the flying object 20 based on the guidance signal. Also, the steering device 230 accelerates the flying object 20. Note that an attitude angle shows the front direction of the flying object 20 such as roll, pitch and yaw of the flying object 20. Also, the detecting device 200 contains, for example, a radar device. The inertia device 210 contains, for example, an acceleration sensor and a gyro sensor. A control device such as a rocket engine and a flight control surface of the flying object 20 is exemplified as the steering device 230.

Figure 4:
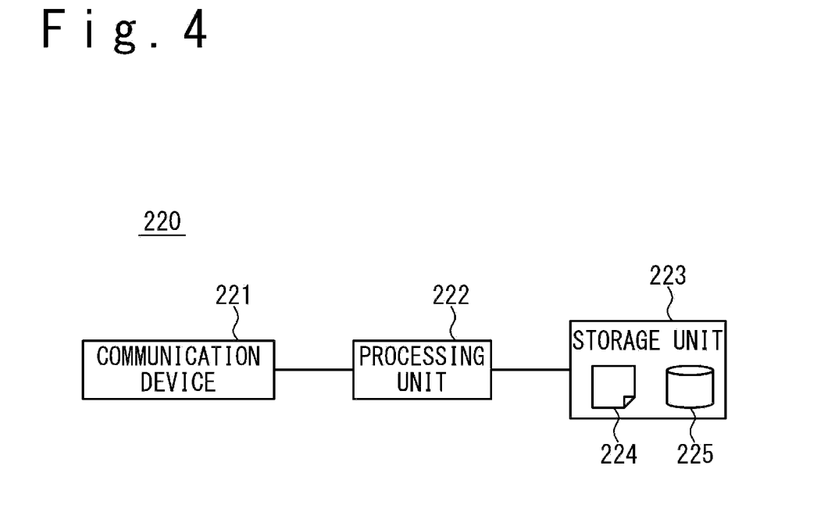
FIG. 4 is a diagram showing a configuration of a guiding device shown in FIG. 3.

As shown in FIG. 4, the guiding device 220 has a communication device 221, a processing unit 222 and a storage unit 223. The communication device 221 carries out transmission and reception of data with other devices. For example, the communication device 221 receives a detection signal which contains the detection data outputted from the detecting device 200 and an inertia signal which contains the inertia data outputted from the inertia device 210. Also, the communication device 221 outputs the guidance signal to the steering device 230. The communication device 221 is connected with the processing unit 222 to transmit the received data to the processing unit 222. Also, the communication device 221 outputs a signal outputted from the processing unit 222 to other devices. For example, the communication device 221 contains an NIC (Network Interface Card) to communicate with a device connected with a LAN (Local Area Network). Also, various devices such as a connector directly connected with an external device like a USB (Universal Serial Bus) connector and an antenna for radio communication are exemplified as the communication device 221. The communication device 221 may be a terminal to receive a signal, a buffer and so on.

The processing unit 222 reads a guidance program 224 stored in the storage unit 223, and executes the guidance program 224. Also, the processing unit 222 stores data supplied from the communication device 221 in the storage unit 223 according to need. The processing unit 222 contains a central processing unit (CPU).

The storage unit 223 stores the guidance program 224, lofted flight course data 225 and data necessary for the processing unit 222 to execute the guidance program 224. The storage unit 223 outputs the stored data to the processing unit 222 in response to an instruction from the processing unit 222. The storage unit 223 contains various devices such as a read and write enable recording medium and a read-only recording medium. As the read and write enable recording medium, a HDD (Hard Disk Drive), an USB memory, and a RAM (Random Access Memory) are contained. As the read-only recording medium, CD (Compact Disk) and so on are contained.

The lofted flight course data 225 contains course data showing a plurality of lofted flight courses 6 calculated by using simulations. The optimal lofted flight course 6 is different according to the state such as the position and speed of the flying object 20 and the state such as the position and speed of the target 1. Therefore, the lofted flight course 6 is calculated by carrying out the simulation based on a simulation condition as a combination of the state of the flying object 20 and the state of the target 1. The plurality of lofted flight courses 6 are determined by calculating the lofted flight course 6 for each of the plurality of simulation conditions. The course data of the plurality of lofted flight courses 6 are stored in the lofted flight course data 225 together with data showing the simulation conditions. In the lofted flight course data 225, the course data of the lofted flight course 6 is related to the data showing the simulation condition used for the calculation. The details of the simulation condition will be descried later.

Figure 5:
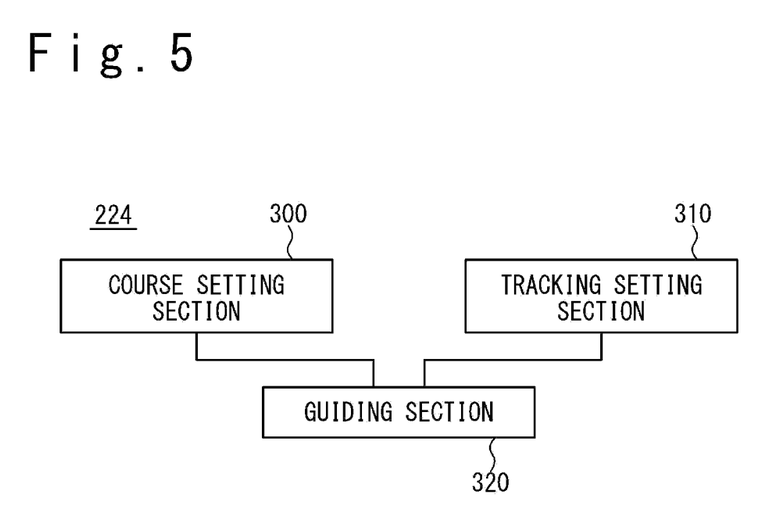
FIG. 5 is a diagram showing a configuration of a guiding program stored in a storage unit of FIG. 4.

The guiding device 220 determines the flight course of the flying object 20 by carrying out processing by the processing unit 222 based on the guidance program 224 stored in the storage unit 223. As shown in FIG. 5, the guidance program 224 has a course setting section 300, a tracking setting section 310 and a guiding section 320. When the lofted flight should be carried out based on the detection data and the inertia data, the course setting section 300 sets the lofted flight course 6. The tracking setting section 310 sets a homing course for the target 1 along the ordinary course 5 based on the detection data and the inertia data. The guiding section 320 determines the progressing direction and thrust to be set to the flying object 20 based on the lofted flight course 6 set by the course setting section 300 and the tracking course set by the tracking setting section 310. The guiding section 320 generates and outputs the guidance signal which contains data showing the determined progressing direction and thrust.

The flying object 20 is set with a flight course to the target 1 when the flying object 20 is launched from the aircraft 10.

The method of setting the flight course to the target 1 upon launching the flying object 20 will be described. Upon launching the flying object 20, the guiding device 220 reads the guidance program 224 from the storage unit 223 and executes the guiding method shown in FIG. 6. A period for launching the flying object 20 is a period for a series of operations of launching the flying object 20, and may contain a timing immediately before and a timing immediately after the flying object 20 is separated from the aircraft 10.

Figure 6:
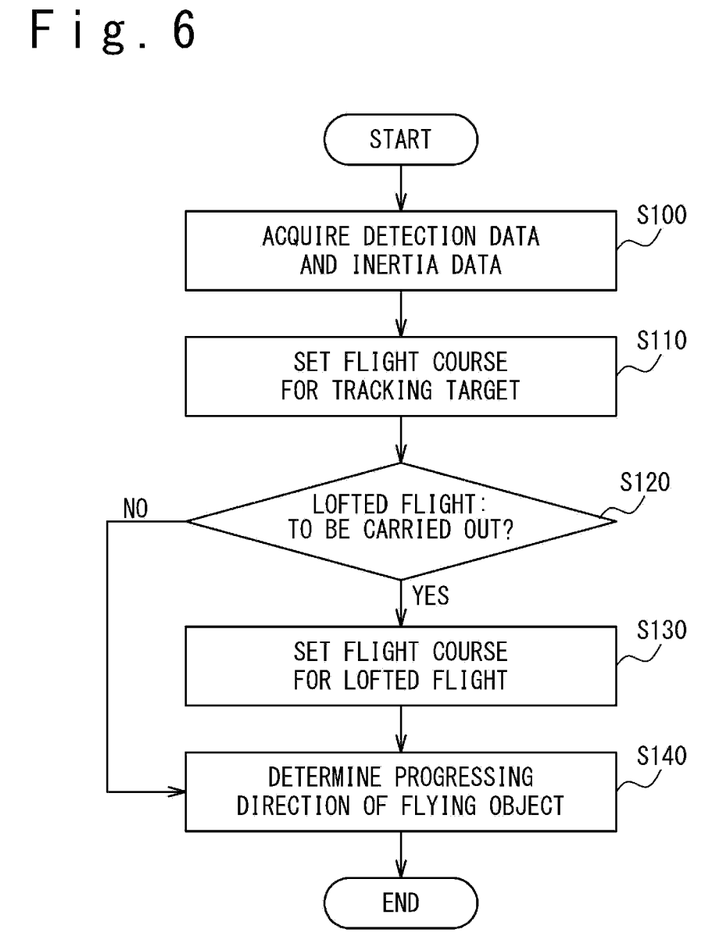
FIG. 6 is a flow chart of a guiding method upon launching the flying object.

At a step S100, the guiding device 220 receives the state of the target 1 as the detection data detected by the detecting device 200. For example, the state of the target 1 contains the position, speed and acceleration. The detecting device 200 detects the state of the target 1 one after another. Therefore, the speed and acceleration of the target 1 may be calculated from records of the detected position of the target 1. For example, the speed of the target 1 may be calculated from a distance between a position currently detected by the detecting device 200 and a position immediately before detected and a time between the two detections. Also, the acceleration of the target 1 may be calculated from the change of the speed.

Also, the guiding device 220 receives as the inertia data, the state of the flying object 20 measured by the inertia device 210. For example, the state of the flying object 20 contains the position, speed, acceleration and attitude angle.

At a step S110, the tracking setting section 310 is achieved based on the guidance program by the processing unit 222 and sets the homing course to track the target 1 to the flying object based on the detection data and the inertia data. The homing course is an ordinary course 5 used to track the target 1 when the lofted flight is not carried out. Moreover, the tracking setting section 310 determines the progressing direction and tracking thrust to be set based on the homing course when the lofted flight is not carried out.

At a step S120, the course setting section 300 is achieved based on the guidance program by the processing unit 222 and determines whether the lofted flight should be carried out, based on the detection data and the inertia data. For example, the course setting section 300 determines that the lofted flight should be carried out based on the detection data and the inertia data when a distance from the flying object 20 to the target 1 is longer than a predetermined distance. The predetermined distance may be calculated based on a range or maximum flight distance of the flying object 20. When the course setting section 300 determines that the lofted flight should not be carried out, the lofted flight course 6 is not set to the flying object 20, and the control advances to a step S140.

The course setting section 300 holds the lofted flight course data 225. At the step S130 step, the course setting section 300 selects the course data showing the lofted flight course 6 from among the lofted flight course data 225 based on the detection data and the inertia data, and sets the selected course data. The selected lofted flight course 6 is one flight course for the flying object 20 to carry out the lofted flight. The lofted flight course data 225 contains the course data showing the optimal flight courses calculated based on simulation conditions as combinations of the state of the flying object 20 and the state of the target 1. In the simulation, the plurality of simulation conditions are set in which the state of the flying object 20 or the state of the target 1 are different from other combinations, and the plurality of course data are calculated. In the lofted flight course data 225, the plurality of course data are related to the plurality of simulation conditions. Here, the detection data contain the data showing the state of the target 1, and the inertia data contain data showing the state of the flying object 20. Therefore, the course setting section 300 extracts one simulation condition which is the most similar to the combination of the detection data and the inertia data, from among the plurality of simulation conditions. The course setting section 300 sets as the lofted flight course 6, the flight course shown in the course data related to the extracted simulation condition.

Moreover, the course setting section 300 determines a correction flight course showing the flight course to be corrected and a correction thrust showing the thrust to be corrected, based on the lofted flight course 6. The correction flight course shows a difference between the flight course in case of the flight along the ordinary course 5 and a flight course in case of the flight along the lofted flight course 6. Also, the correction thrust shows a difference between the thrust in case of the flight along the ordinary course 5 and the thrust in case of the flight along the lofted flight course 6.

At the step S140, the guiding section 320 is achieved based on the guidance program by the processing unit 222 and determines the progressing direction of the flying object 20 based on the homing course set by the tracking setting section 310 and the lofted flight course 6 set by the course setting section 300. Specifically, the guiding section 320 determines a flight course to be set to the flying object 20 by adding the correction course determined by the course setting section 300 to the homing course determined by the tracking setting section 310. Also, the guiding section 320 determines a thrust to be set to the flying object 20 by adding the correction thrust determined by the course setting section 300 to the tracking thrust determined by the tracking setting section 310. The guiding section 320 outputs the guidance signal which contains data showing a setting flight course and a setting thrust.

At the step S120, when the lofted flight is determined not to be carried out, the lofted flight course 6 is not set. Therefore, at the step S140, the guiding section 320 determines the homing course as the setting flight course and determines the tracking thrust as the setting thrust. The guiding section 320 outputs the guidance signal which contains data showing the setting course and the setting thrust.

As shown in FIG. 3, the guidance signal outputted from the guiding section 320 is outputted to the steering device 230 from the guiding device 220. The steering device 230 controls the progressing direction of the flying object 20 based on the guidance signal to generate the thrust. Thus, the flying object 20 is detached from the aircraft 10 to start the flight.

As mentioned above, the flying object 20 determines whether the lofted flight should be carried out, when being launched from the aircraft 10. When the lofted flight should be carried out, the lofted flight course 6 is set. When detecting the flying object 20, the target 1 carries out evacuation behavior 7, as shown in FIG. 2. Therefore, the flying object 20 changes the flight course according to the evacuation behavior 7.

Next, a method will be described of changing the lofted flight course 6 set once according to the evacuation behavior 7 of the target 1 after the flying object 20 is launched. After the launching of the flying object 20, the guiding device 220 executes a guiding method shown in FIG. 7 based on the guidance program 224. Since the flying object 20 changes the flight course after detecting the evacuation behavior 7, the flying object 20 may change the flight course from the lofted flight course 6 after a predetermined time from the launching of the flying object 20. For example, the guiding device 220 may change the flight course from the lofted flight course 6 after the flying object 20 starts the lofted flight. In other words, the flying object 20 may change the flight course from the lofted flight course 6 after changing the progressing direction such as the elevation angle to carry out the lofted flight.

Figure 7:
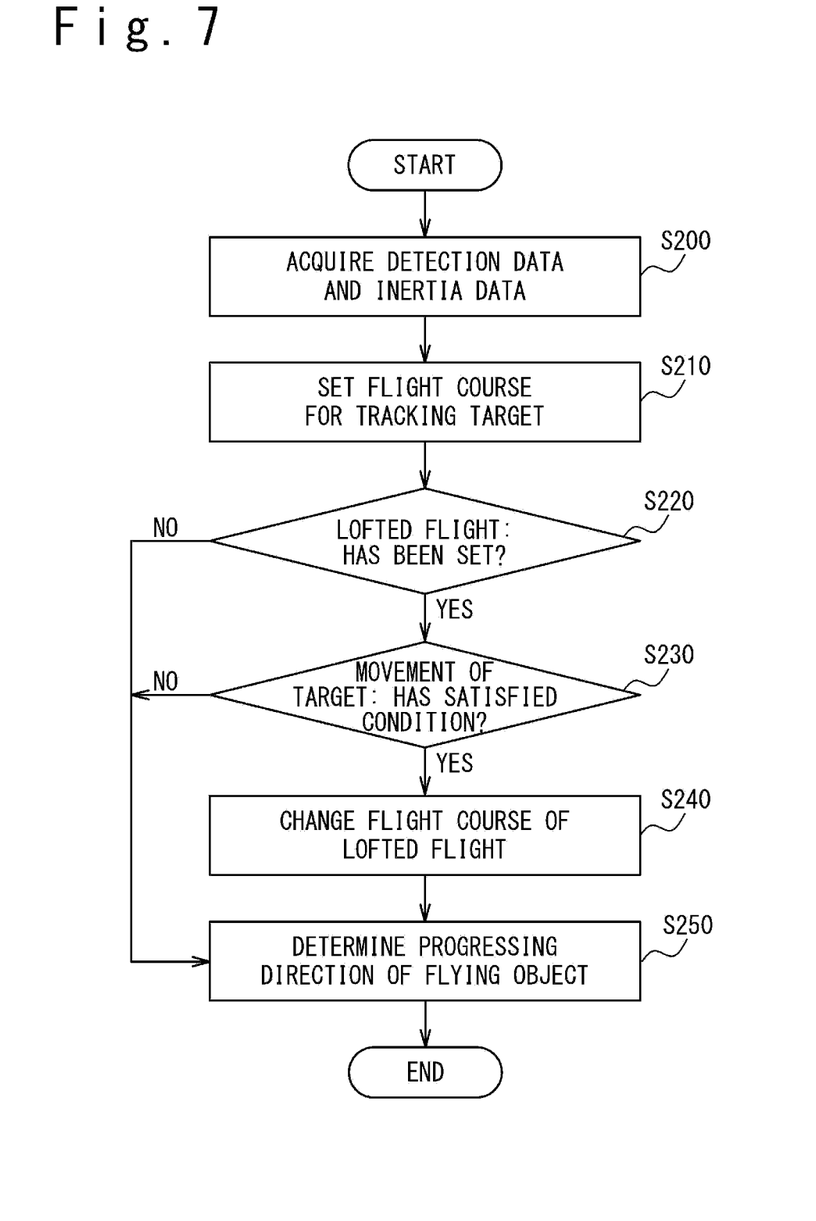
FIG. 7 is a flow chart of the guiding method after launching the flying object.

At a step S200, the guiding device 220 receives the detection data showing the state of the target 1 detected by the detecting device 200, like the step S100. Also, the guiding device 220 receives the inertia data showing the state of the flying object 20 measured by the inertia device 210. In other words, this detection data shows the state of the target 1 detected by the detecting device 200 at a current time after the flying object 20 is launched from the aircraft 10. In the same way, the inertia data is the data measured by the inertia device 210 at the current time after the flying object 20 is launched from the aircraft 10.

At a step S210, the tracking setting section 310 sets the homing course to track the target 1 based on the detection data and the inertia data, like the step S110.

At a step S220, the course setting section 300 determines whether or not the lofted flight course 6 has been set. When the lofted flight course 6 has been set, the control advances to a step S230 and the course setting section 300 determines whether or not it is necessary to change the flight course. When the lofted flight course 6 has not been set, the control advances to a step S250, and the setting section 300 determines the progressing direction of the flying object 20 based on the homing course.

At the step S230, the course setting section 300 determines whether or not the movement of the target 1 meets the change condition based on the detection data. For example, the course setting section 300 determines whether the target 1 changed the progressing direction, speed and so on rapidly through the evacuation behavior 7. When the movement of the target 1 has been rapidly changed, there is a possibility that the flight possible distance becomes short, when the flying object 20 flies along the lofted flight course 6 calculated upon the launching. Therefore, when the movement of the target 1 meets the change condition, for example, when the course of the target 1 has been rapidly changed, the flying object 20 changes its flight course. To determine whether or not the movement of the target 1 meets the change condition, the course setting section 300 compares the acceleration of the target 1 and a predetermined threshold value. When the acceleration of the target 1 is larger than the threshold value, the course setting section 300 determines that the movement of the target 1 meets the change condition. When determining that the movement of the target 1 meets the change condition, the control advances to a step S240 and the course setting section 300 changes the flight course. When determining that the movement of the target 1 does not meet the change condition, the control advances to the step S250.

At the step S240, the course setting section 300 selects the lofted flight course 6 from among the lofted flight course data 225 based on the detection data and the inertia data, and sets the selected lofted flight course 6, like the step S130.

At the step S250, the guiding section 320 sets the progressing direction of the flying object 20 based on the homing course and the lofted flight course 6, like the step S140. The guiding section 320 outputs the guidance signal based on the set progressing direction of the flying object 20.

As shown in FIG. 3, the guiding device 220 outputs the guidance signal to the steering device 230. The steering device 230 changes the progressing direction of the flying object 20 in response to the guidance signal. Thus, the flying object 20 can change the lofted flight course 6 even when the target 1 changes the course rapidly through the evacuation behavior 7. As a result, the flying object 20 can fly along the flight course corresponding to the evacuation behavior 7 of the target 1, and the interception probability of the target 1 is improved.

(Simulation Condition)

The simulation condition used to calculate the lofted flight course 6 will be described. The simulation condition contains the state of the flying object 20 and the state of the target 1. For example, the position of the flying object 20 and the position of the target 1 may be contained in the simulation condition. In such a case, the lofted flight course 6 shows the optimal course calculated by carrying out the simulation based on the position of the flying object 20 and the position of the target 1. All or part of the position, speed, acceleration and attitude angle of the flying object 20 may be contained in the simulation condition as the state of the flying object 20. Also, all or part of the position, speed and acceleration of the target 1 may be contained in the simulation condition as the state of the target 1. Moreover, the flight performance of the flying object 20 such as the turning performance and aerodynamic characteristics may be contained in the simulation condition.

(Modification Example)

In the above embodiment, an example has been shown in which the course setting section 300 determines whether or not the movement of the target 1 meets the predetermined change condition, by using the acceleration of the target 1, at the step S230. However, the present invention is not limited to this. The change condition may contain an optional condition showing that the movement of the target 1 was changed rapidly. For example, the course setting section 300 may determine that the movement of the target 1 meets the change condition when the position of the target 1 is out of an estimated course. In this case, the course setting section 300 estimates the course of the target 1 when launching the flying object 20. The course setting section 300 determines whether or not the position of the target 1 is out of the estimated course based on the detection data after launching the flying object 20. Also, the course setting section 300 may determine that the position of the target 1 is out of the estimated course, when a distance between a current position on the estimated course and an actual position of the target 1 is longer than a predetermined value.

Also, the course setting section 300 may determine whether or not the movement of the target 1 meets the change condition, based on the change of acceleration of the target 1. In this case, the course setting section 300 calculates the change of acceleration of the target 1 based on records of acceleration acquired from the detection data. The course setting section 300 determines that the movement of target 1 meets the change condition, when the change of acceleration of the target 1 is larger than a predetermined value. For example, a difference vector showing a difference between accelerations at two times is calculated, and an absolute value of the difference vector is determined as the change of acceleration. The two times may be a time when the flying object 20 was launched from the aircraft 10 and a time when the latest detection data was acquired. Also, the two times may be a time when the latest detection data was acquired and a time when once previous detection data was acquired.

Also, the course setting section 300 may determine that the course of target 1 was changed rapidly, by using the change condition in which these conditions are combined optionally. For example, the course setting section 300 may determine that the change condition is met, when either or both of the acceleration being larger than the predetermined threshold value and the position of target 1 being out of the estimated course are met.

An example has been shown in which the course setting section 300 determines whether or not the lofted flight course 6 is set at the step S220. However, the present invention is not limited to this. The course setting section 300 may change the flying object 20 which is not in the lofted flight to carry out the lofted flight according to the evacuation behavior 7 of the target 1. In this case, the step S220 can be omitted.

The course setting section 300 may determine whether the lofted flight should be carried out, based on the detection data and the inertia data at the step S240. When determining that the lofted flight is not carried out, the course setting section 300 cancels the already set lofted flight course 6, and the step S240 ends. In this case, since the set lofted flight course 6 was cancelled, the guiding section 320 determines the progressing direction of the flying object 20 based on the homing course calculated by the tracking setting section 310. Also, when determining that the lofted flight is not carried out, the course setting section 300 may output lofted flight stop data showing not to carry out the lofted flight to the guiding section 320. The guiding section 320 determines the progressing direction of the flying object 20 based on the homing course calculated by the tracking setting section 310 in response to the lofted flight stop data.

The ordinary course 5 in which the lofted flight is not carried out may be contained in the lofted flight course data 225. When the course setting section 300 selects the ordinary course 5 from among the lofted flight course data 225, this means that the lofted flight is not carried out. In this case, the processing unit 222 selects the ordinary course 5 when the flying object 20 does not carry out the lofted flight. Therefore, the course setting section 300 may omit the determination (the step S120 in FIG. 6) of whether or not the lofted flight is carried out when the flying object 20 is launched. Also, the course setting section 300 may omit the determination (the step S220 in FIG. 7) of whether or not the lofted flight course has been set after the flying object 20 is launched.

Also, the lofted flight course data 225 may contain the correction flight course and the correction thrust which are determined based on the lofted flight course 6 by the course setting section 300. In this case, the correction flight course and the correction thrust are related to the simulation condition when the corresponding lofted flight course 6 is calculated. Therefore, at the step S130 and the step S240, the course setting section 300 extracts the simulation condition based on the detection data and the inertia data. The course setting section 300 directly selects the correction flight course and the correction thrust which are related to the extracted imitation information.

In the above embodiments, an example has been shown in which the homing course and the lofted flight course 6 are set based on the detection data and the inertia data. However, the present invention is not limited to this. For example, when data showing a relative distance, relative velocity, and relative acceleration and so on of the target 1 to the flying object 20 are contained in the detection data, the homing course and lofted flight course 6 may be set based on the detection data. In this case, the course data contained in the lofted flight course data 225 are calculated by using the relative distance, relative velocity, and relative acceleration and so on of the target 1 to the flying object 20.

Also, the detecting device 200 may acquire weather data showing temperature, pressure and so on outside the flying object 20, to transmit to the guiding device 220 as a weather signal. In this case, the guiding device 220 calculates an air density based on the weather data. Especially, when the flying object 20 turns by use of the aerodynamic steering, the turn ability changes depending on the air density. Therefore, the course setting section 300 may calculate the air density based on the acquired weather data to determine the lofted flight course 6 by use of the air density. In this case, the course data contained in the lofted flight course data 225 are calculated by using the weather data in addition to the state of the flying object 20 and the state of the target 1. Also, the detecting device 200 may acquire the weather data showing temperature, pressure and so on outside the flying object 20 to calculate the air density. In this case, the detecting device 200 transmits the weather signal which contains the weather data showing the air density, to the guiding device 220.

In the above embodiments, an example has been showed in which the course setting section 300 selects the course data contained in the lofted flight course data 225, based on the detection data and the inertia data. However, the present invention is not limited to this. The course setting section 300 is enough to determine the lofted flight course 6 and can select an optional method. For example, the course setting section 300 may calculate the lofted flight course 6 based on the detection data and the inertia data.

In the above embodiments, an example has been shown in which the aircraft 10 launches the flying object 20. However, the present invention is not limited to this. A mother machine which launches the flying object 20 can be selected optionally. For example, land facilities, vehicles, ships and so on are contained in the mother machines.

Figure 8:
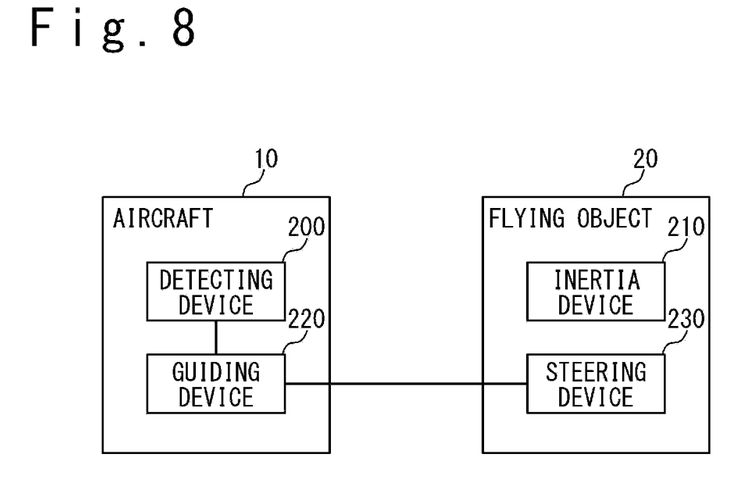
FIG. 8 is a diagram showing a configuration of a guiding system when a detecting device and the guiding device are provided for an aircraft.

In the above embodiments, an example has been shown in which the detecting device 200, the inertia device 210, the guiding device 220 and the steering device 230 are provided in the flying object 20. However, the present invention is not limited to this. For example, as shown in FIG. 8, the detecting device 200 and the guiding device 220 may be provided in the aircraft 10 as the mother machine. In this case, the detecting device 200 detects the state of the flying object 20 and the state of the target 1. Therefore, data showing the state of the flying object 20 and the state of the target 1 are contained in the detection data. The guiding device 220 determines the progressing direction of the flying object 20 based on the detection data. The guiding device 220 generates the guidance signal containing data showing the determined progressing direction. The generated guidance signal is transmitted to the steering device 230 by using radio communication. Also, the detecting device 200, the guiding device 220 and the steering device 230 may be provided in different apparatuses.

The processing described above is an example. The order and processing contents of each step may be modified in a range without preventing the function. Also, the described configuration may be changed or modified optionally in the range without preventing the function. For example, the course setting section 300, the tracking setting section 310 and the guiding section 320 may be executed in different devices. For example, the guiding device 220 which executes the course setting section 300 and the guiding section 320 may be added to an existing apparatus which sets the flight course to track the target 1. In this case, the guiding device 220 receives data outputted from the existing apparatus, the detection data and the inertia data, and executes the guidance program 224 for the course setting section 300 and the tracking setting section 310. Also, the guiding device 220 may repeatedly execute the guiding method shown in FIG. 7, after launching the flying object 20. In this case, the guiding device 220 may execute the guiding method shown in FIG. 7 in a predetermined time interval. Also, the guiding device 220 may execute the guiding method shown in FIG. 7 by the predetermined number of times.

The present application is based on Japanese Patent Application JP 2018-153281, and claims a priority based on that application. The disclosure of that application is incorporated herein by reference.

What is claimed is:

1. A guiding device comprising:
a communication device configured to receive a detection signal which contains detection data of a target; and
a processing unit configured to determine a progressing direction of a flying object based on the detection data,
wherein the processing unit comprises:
a course setting section configured to set a flight course for a lofted flight based on the detection data when the flying object carries out the lofted flight for the target, wherein the flight course for the lofted flight includes that the flying object accelerates and increases an elevation angle when the flying object carries out the lofted flight; and
a guiding section configured to determine the progressing direction based on the flight course and output a guidance signal which contains data showing the progressing direction, and
wherein the course setting section is configured:
to set a first flight course as the flight course when the flying object is launched; and
to change the flight course from the first flight course to a second flight course based on the detection data after launching of the flying object.

2. The guiding device according to claim 1, wherein the course setting section changes the flight course from the first flight course to the second flight course after the flying object starts the lofted flight.

3. The guiding device according to claim 1, wherein the course setting section:
acquires movement of the target based on the detection data, and
changes the flight course from the first flight course to the second flight course when the movement of the target meets a change condition.

4. The guiding device according to claim 3, wherein the movement of the target contains an acceleration, and
wherein the change condition contains the acceleration being larger than a predetermined threshold value.

5. The guiding device according to claim 1, wherein the course setting section holds a plurality of optimal flight courses calculated based on a plurality of simulation conditions,
wherein the plurality of simulation conditions contain an air density,
wherein the communication device receives a weather signal which contains weather data, and
wherein the course setting section is configured:
to acquire the air density based on the weather data; and
to select the first flight course and the second flight course from among the plurality of optimal flight courses based on the air density and the detection data.

6. The guiding device according to claim 1, further comprising:
a tracking setting section configured to set a homing course of the target when the lofted flight is not carried out based on the detection data,
wherein the guiding section determines the progressing direction of the flying object based on the first flight course or the second flight course, and the homing course.

7. A flying object comprising:
a guiding device; and
a steering device configured to control a progressing direction of the flying object in response to a guidance signal,
wherein the guiding device comprises:
a communication device configured to receive a detection signal which contains detection data of a target; and
a processing unit configured to determine the progressing direction of the flying object based on the detection data,
wherein the processing unit comprises:
a course setting section configured to set a flight course for a lofted flight based on the detection data when the flying object carries out the lofted flight for the target, wherein the flight course for the lofted flight includes that the flying object accelerates and increases an elevation angle when the flying object carries out the lofted flight; and
a guiding section configured to determine the progressing direction based on the flight course and output the guidance signal which contains data showing the progressing direction, and
wherein the course setting section is configured:
to set a first flight course as the flight course when the flying object is launched; and
to change the flight course from the first flight course to a second flight course based on the detection data after launching of the flying object.

8. A guiding method comprising:
setting a first flight course for a lofted flight when a flying object carries out the lofted flight for a target based on detection data of the target in case of launching the flying object, wherein the flight course for the lofted flight includes that the flying object accelerates and increases an elevation angle when the flying object carries out the lofted flight;
determining a progressing direction of the flying object based on the first flight course, to output a guidance signal which contains data showing the progressing direction;
changing a flight course from the first flight course to a second flight course for the lofted flight when the flying object carries out the lofted flight for the target based on the detection data, after launching of the flying object; and
determining the progressing direction based on the second flight course, to output a guidance signal which contains data showing the progressing direction.

* * * * *